July 7, 1953     W. J. BENNES ET AL     2,644,195
METHOD AND APPARATUS FOR FORMING FILMS
Filed May 14, 1949     2 Sheets-Sheet 1
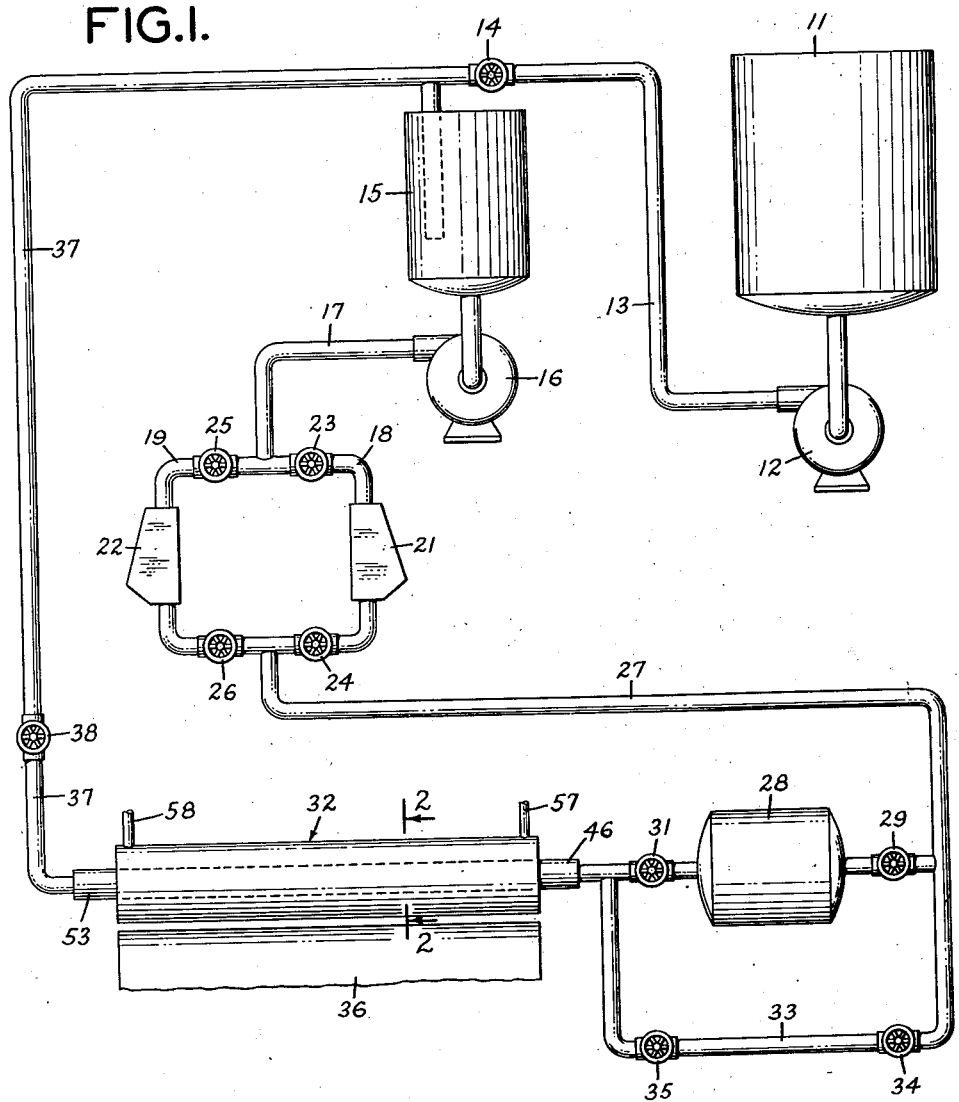
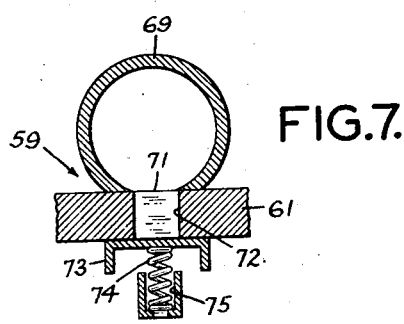
INVENTORS.
WILLIAM J. BENNES
BY CHARLES E. LEYES
ATTORNEYS July 7, 1953 W. J. BENNES ET AL 2,644,195
METHOD AND APPARATUS FOR FORMING FILMS
Filed May 14, 1949 2 Sheets-Sheet 2
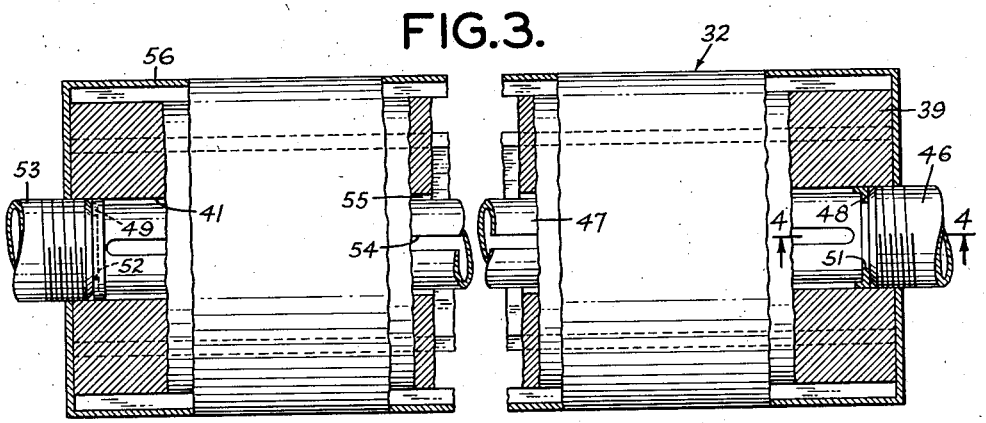
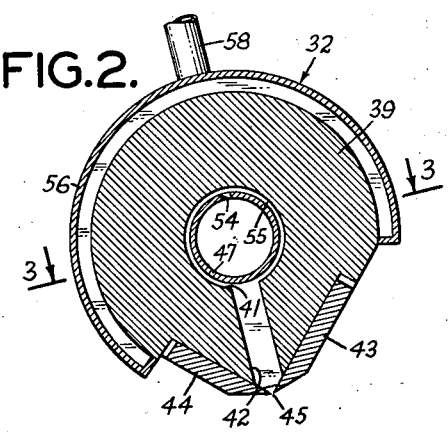
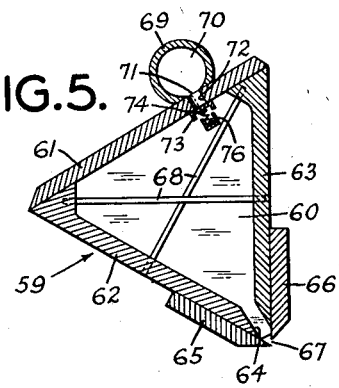
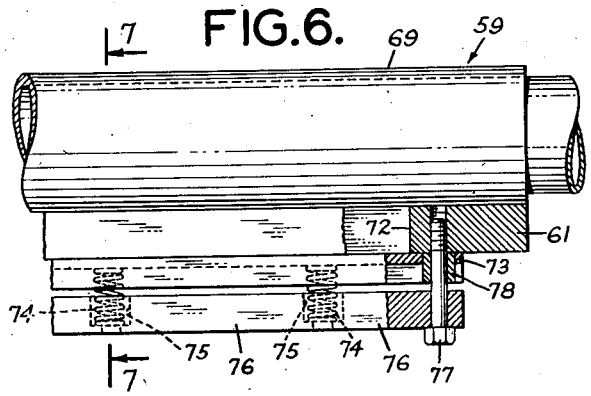
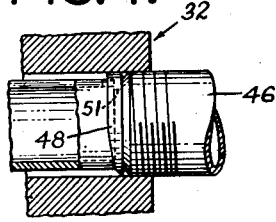
INVENTORS.
WILLIAM J. BENNES
BY CHARLES E. LEYES
ATTORNEYS Patented July 7, 1953

2,644,195

UNITED STATES PATENT OFFICE 2,644,195

METHOD AND APPARATUS FOR FORMING FILMS

William John Bennes, Irvington, and Charles Edward Leyes, Union, N. J., assignors to Celanese Corporation of America, New York, N. Y., a corporation of Delaware Application May 14, 1949, Serial No. 93,352

20 Claims. (Cl. 18—15)

This invention relates to films and relates more particularly to an improved process and apparatus for preparing films.

Films are customarily prepared by extruding a film-forming material through an aperture in a hopper onto a smooth surface, such as a casting wheel or band, or into a hardening medium. It is important that the thickness of the films produced in this manner be uniform, since any material variations in thickness will render the films commercially unacceptable. Many expedients have been suggested for obtaining the requisite uniformity in the thickness of the films. For example, it has been proposed to employ a hopper of massive construction so that the pressure of the film-forming material would not distort the hopper or the extrusion aperture. It has also been proposed to provide a plurality of adjusting means along the extrusion aperture by means of which the aperture size could be varied to control the thickness of the films being produced. Another expedient that has been proposed is the insertion of a tightly coiled wire in the hopper adjacent the extrusion aperture. The coiled wire was supported on elevating screws, which could be adjusted to move the coiled wire with respect to the extrusion aperture to provide a varying obstruction to the flow of film-forming material to said aperture thereby effecting a degree of control in the thickness of the films. While these several expedients produced some improvements in the uniformity of film thickness, they were not successful in that irregular and unexplained variations in film thickness still occurred. Moreover, with these expedients, frequent readjustments were necessary to maintain the film thickness within commercially acceptable limits.

It is an important object of this invention to provide a process and apparatus for preparing films which will be free from the foregoing and other disadvantages of the prior processes and apparatus.

A further object of this invention is the provision of an improved process and apparatus for preparing films, which will yield films having a substantially uniform thickness.

Other objects of this invention, together with certain details of construction and combinations of parts, will be apparent from the following detailed description and claims.

We have now discovered that the variations in the thickness of films produced by prior processes and apparatus are due in large part to irregularities in the flow pattern of the film-forming material through the hopper. Because of these irregularities in flow pattern, the pressure in the hopper varies from point to point and, as a result, different quantities of film-forming material flow to different parts of the extrusion aperture. These irregularities in flow pattern also give rise to temperature differentials in the hopper, which alter the viscosity of the film-forming material and produce further differences in the flow of the film-forming material to the extrusion aperture. The temperature differentials also affect the physical properties of the films, producing hard spots and other defects therein. Since none of the expedients previously suggested for obtaining a film of uniform thickness eliminates the irregularities in the flow pattern of the film-forming material they can be of only limited utility.

In accordance with this invention, the irregularities in the flow pattern of the film-forming material are eliminated by passing a stream of the film-forming material through a hopper having an extrusion aperture and diverting a portion only of the film-forming material from the stream to the extrusion aperture by means extending the full length of said aperture. With the irregularities in the flow pattern of the film-forming material eliminated, the temperatures and pressure in the hopper no longer vary in an irregular manner and, as a result, there are no variations in the flow of the film-forming material to different parts of the extrusion aperture. Accordingly, the films extruded from this aperture will have a substantially uniform thickness. Some improvements in film thickness uniformity can also be obtained by passing a stream of the film-forming material through a hopper having an extrusion aperture and diverting a portion only of the film-forming material from the stream to the extrusion aperture by means that do not extend along the full length of said aperture; or by feeding all of the film-forming material directly to the extrusion aperture by means extending along the full length of said aperture. However, the combination of partial diversion of the film-forming material and full length feed gives results greatly superior to those obtained by the independent use of these expedients.

While the percentage of the film-forming material that passes through the hopper without diversion to the extrusion aperture may be varied over a considerable range, best results are obtained when this percentage is from about 25 to 50% and the remainder, namely from about 75 to 50%, is extruded in the form of a film. The portion of the film-forming material that passes through the hopper may be recirculated to the hopper by any suitable means. While the film-forming material is being circulated outside the hopper, its temperature may be controlled by suitable heating or cooling means maintained in heat exchange relation thereto. In many cases, the recirculation of the film-forming material through the hopper at a controlled temperature is sufficient to maintain the hopper temperature constant and permits of the elimination of the jacket employed with certain hoppers for temperature control.

The process of this invention may be carried out with scraper hoppers which are open to the atmosphere and in which the film-forming material flows through the extrusion aperture under the influence of gravity. However, it is especially useful with pressure hoppers, which are closed to the atmosphere and in which a hydraulic pressure is developed by any suitable means, such as a pump, to force the film-forming material through the extrusion aperture. The hoppers may be of any suitable cross-section and may have any desired length, depending upon the width of the films to be extruded therefrom. The extrusion aperture may be either fixed or adjustable and may be constructed of highly finished blades fastened to the body of the hopper, as is well known in the art, or in any other desired manner.

This invention may be employed for the preparation of films from melts and other compositions containing a film-forming material. However, it is especially useful for the preparation of films from dope, comprising a solution of a film-forming ingredient in a volatile solvent. Among the film-forming materials that may be employed are organic derivatives of cellulose including cellulose esters, such as cellulose acetate, cellulose propionate, cellulose butyrate, cellulose acetate-propionate and cellulose acetate-butyrate; cellulose ethers, such as ethyl cellulose and benzyl cellulose; and cellulose ether-esters. In addition, other film-forming materials may be employed, such as vinyl chloride-vinyl acetate copolymers, polyvinylidene chloride, polystyrene or polyethylene. The volatile solvents in which the film-forming materials may be dissolved to form a dope include ketones, such as acetone, acetone and ethyl alcohol, chlorinated hydrocarbons such as chloroform, methylene dichloride, ethylene dichloride in combination with alcohols, aromatic hydrocarbons such as benzene, toluene, petroleum spirit, pentanes, or organic acids such as acetic acid. The dope may also contain plasticizers, such as triphenyl phosphate, diethyl phthalates, or ethyl phthalyl ethyl glycollate, dyes and other agents to modify the properties of the films produced therefrom.

A preferred embodiment of our invention is illustrated in the accompanying drawings, in which:

Fig. 1 is a diagrammatic view showing the circulation system for the film-forming material, Fig. 2 is a cross-sectional view taken on the line 2—2 in Fig. 1, in the direction of the arrows, showing the structure of the hopper, Fig. 3 is a cross-sectional view taken on the line 3—3 in Fig. 2, in the direction of the arrows, Fig. 4 is a detail view showing the manner in which the film-forming material is admitted to the hopper, Fig. 5 is a cross-sectional view showing a hopper of modified structure, Fig. 6 is a detail view on an enlarged scale of one end of the hopper shown in Fig. 5, showing the means employed for diverting the film-forming material to the extrusion aperture, and Fig. 7 is a cross-sectional view taken on the line 7—7 in Fig. 6, in the direction of the arrows.

Like reference numerals indicate like parts throughout the several views of the drawings.

Referring now to the drawings, the reference numeral 11 designates a storage tank from which a film-forming material is forced by means of a pump 12 through a conduit 13, provided with a control valve 14, into a tank 15. From the tank 15, the film-forming material is forced by means of a pump 16 into a conduit 17, which opens into branch conduits 18 and 19 having filters 21 and 22 mounted therein and provided with control valves 23 and 24, and 25 and 26, respectively. During operation, the film-forming material is directed by the valves 23, 24, 25 and 26 through one or the other of the filters 21 and 22, permitting the filter not in use to be cleaned. The film-forming material then enters a conduit 27, which is connected to a heat exchanger 28 through a control valve 29. After leaving the heat exchanger 28, the film-forming material passes through a control valve 31 into a hopper, indicated generally by reference numeral 32. A conduit 33 provided with control valves 34 and 35 permits the film-forming material to by-pass the heat exchanger 28 when no heating or cooling of said material is required prior to its entry into the hopper 32. A portion of the film-forming material entering the hopper 32 will be extruded therefrom and deposited as a film on a casting surface 36. The remainder of the film-forming material passes through the hopper 32 into a conduit 37, provided with a control valve 38, and is discharged from said conduit into the tank 15. The valve 38 controls the rate of flow of the film-forming material through the circulating system and also acts as a throttling valve by means of which the pressure drop across the hopper 32 can be regulated.

The hopper 32 comprises a cylindrical body 39 having a circular passageway 41 extending longitudinally thereof, a throat 42 extending radially from the passageway 41 to the surface of the body 39 and blades 43 and 44 fastened to the body 39, which blades extend across the throat 42 and define an extrusion aperture 45. Film-forming material is admitted into the hopper 32 through a pipe 46, which opens into a conduit 47 positioned concentrically of the passageway 41 and maintained in position by means of collars 48 and 49 having apertures 51 and 52 extending therethrough. A portion of the film-forming material passes through the conduit 47, and is discharged from the hopper 32 through a pipe 53. The remainder of the film-forming material flows through a slot 54 in the conduit 47 into an annular space 55 between the conduit 47 and the body 39. The slot 54, which extends substantially the length of the extrusion aperture 45, faces away from the throat 42 and is preferably diametrically opposed thereto as shown in Fig. 2. After passing through the annular space 55, the film-forming material flows into the throat 42 and thence through the extrusion aperture 45 in the form of a film. The hopper 32 also includes a jacket 56, through which a heat-exchange medium, such as steam, water, air, etc., may be circulated by means of conduits 57 and 58 for temperature control. However, it has been found that the use of a heat-exchange medium is often unnecessary since the temperature of the hopper 32 is maintained constant by the stream of film-forming material passing therethrough.

A hopper 59 of modified construction is shown in Figs. 5, 6 and 7 of the drawings. The hopper 59 comprises a chamber 60 enclosed by a top wall 61, and side walls 62 and 63 that are bevelled at their edges to form a throat 64. Blades 65 and 66 are fastened to the side walls 62 and 63, which blades extend across the throat 64 and define an extrusion aperture 67. Tie rods 68 are fastened between the side walls 62 and 63 to prevent distortion of the hopper 59 when a film-forming material is fed into said hopper under pressure. The hopper 59 also includes a conduit 69 extending longitudinally of the chamber 60 and defining a passageway 70 through which a film-forming material flows. A portion of the film-forming material passes through the conduit 69 without diversion. The remainder of the film-forming material flows through a slot 71 in the conduit 69 into a slot 72 extending through the top wall 61, which slots 71 and 72 extend substantially the length of the extrusion aperture 67. The slot 72 is yieldably closed by means of a channel-iron closure member 73, which is urged against the wall 61 by means of springs 74, carried in apertures 75 in a bar 76 adjustably fastened to the wall 61 with bolts 77. The closure member 73 is aligned with respect to the slot 72 by blocks 78 that are fastened to the closure member and are slidably mounted on the bolts 77. When the pressure of the film-forming material in the conduit 69 exceeds a predetermined minimum, the closure member 73 is forced away from the wall 61, permitting the film-forming material to flow through the slots 71 and 72 to the extrusion aperture 67. This permits a sufficient pressure to be built up in the conduit 69 to obtain adequate circulation of the film-forming material through the hopper 59, without simultaneously applying an excessive pressure to the walls 61, 62 and 63.

The following example is given to illustrate this invention further:

*Example*

Dope comprising about a 25% solution of cellulose acetate in acetone is heated to a temperature of 105° F. and extruded into a film having a thickness of 0.002 inch in the apparatus shown in Fig. 1 of the drawings. Of the dope entering the hopper 32, 35% is passed through the hopper and returned to the tank 15 and the remainder is extruded through the aperture 45 to produce a film. Over an extended period, the average variation in film thickness is less than 5%, with a maximum peak to peak variation of 7%. In addition, the film produced is free from low edges. When the circulation of the dope through the hopper 32 is stopped by closing the valve 38, both the average variation in film thickness and the maximum peak to peak variation increase markedly.

It is to be understood that the foregoing detailed description is given merely by way of illustration and that many variations may be made therein without departing from the spirit of our invention.

Having described our invention, what we desire to secure by Letters Patent is:

1. Process for preparing films by the extrusion of a film-forming material through a shaping orifice, which comprises circulating a stream of said film-forming material under pressure between a source of supply and a hopper filled with said film-forming material under pressure and having a shaping orifice, diverting to said hopper, in the form of a diverted stream whose width is substantially the same as the length of said shaping orifice, a portion only of said circulating stream, passing said portion through said orifice to shape the same into the form of a film and returning the remainder of the film-forming material to the source of supply.

2. Process for preparing films by the extrusion of a film-forming material through a shaping orifice, which comprises circulating a stream of said film-forming material under pressure between a source of supply and a hopper filled with said film-forming material under pressure and having a shaping orifice, diverting to said hopper, in the form of a diverted stream whose width is substantially the same as the length of said shaping orifice, from about 50 to 75% of said circulating stream, passing said portion through said orifice to shape the same into the form of a film and returning the remainder of the film-forming material to the source of supply.

3. Process for preparing films by the extrusion of a film-forming material through a shaping orifice, which comprises circulating a stream of said film-forming material under pressure between a source of supply and a hopper filled with said film-forming material under pressure and having a shaping orifice, diverting a portion only of the film-forming material from that part of said stream under pressure which is within the confines of said hopper, extruding the diverted portion only of the film-forming material through the orifice to shape the same into the form of a film and returning the remainder of the film-forming material to the source of supply.

4. Process for preparing films by the extrusion of a film-forming material through a shaping orifice, which comprises circulating a stream of said film-forming material under pressure between a source of supply and a hopper filled with said film-forming material under pressure and having a shaping orifice, diverting from about 50 to 75% of the film-forming material from that part of said stream under pressure which is within the confines of said hopper, extruding the diverted portion only of the film-forming material through the orifice to shape the same into the form of a film and returning the remainder of the film-forming material to the source of supply.

5. Apparatus for preparing films, comprising a receptacle for holding a supply of film-forming material, a hopper having an extrusion aperture, conduit means, operatively connected to said receptacle and said hopper and being so constructed and arranged so as to lead a stream of film-forming material from said receptacle to said hopper and back to said receptacle, said conduit means having a diversion aperture for the flow of only a portion of said film-forming material out of said conduit means and through said extrusion aperture.

6. Apparatus for preparing films, comprising a receptacle for holding a supply of film-forming material, a hopper having an extrusion aperture, conduit means constructed and arranged to circulate a stream of film-forming material from said receptacle through said hopper and back to said receptacle, said circulating stream flowing through said hopper being within said conduit means, said conduit means having an aperture within said hopper for the diversion of a portion of said stream through said extrusion aperture.

7. Apparatus for preparing films, comprising a receptacle for holding a supply of film-forming material, a hopper having an extrusion aperture, conduits operatively connected to said receptacle and said hopper for movement of film-forming material therebetween, means extending substantially the length of the extrusion aperture for diverting a portion only of a stream of film-forming material passing therethrough, and means for discharging the diverted portion only of the film-forming material through said extrusion aperture, the construction and arrangement being such that the portion of the film-forming material not passing through the extrusion aperture returns to said receptacle.

8. Apparatus for preparing films, comprising a receptacle for holding a supply of film-forming material, a hopper closed to the atmosphere and having an extrusion aperture, conduits operatively connected to said receptacle and said hopper for movement of film-forming material therebetween, and means for discharging a portion only of the film-forming material from said hopper through said extrusion aperture, the construction and arrangement being such that the portion of the film-forming material not passing through the extrusion aperture returns to said receptacle.

9. Apparatus for preparing films, comprising a receptacle for holding a supply of film-forming material, a hopper closed to the atmosphere and having an extrusion aperture, conduits operatively connected to said receptacle and said hopper for movement of film-forming material therebetween, means operatively connected to said hopper for diverting a portion only of a stream of film-forming material passing therethrough, and means for discharging the diverted portion only of the film-forming material through said extrusion aperture, the construction and arrangement being such that the portion of the film-forming material not passing through the extrusion aperture returns to said receptacle.

10. Apparatus for preparing films, comprising a receptacle for holding a supply of film-forming material, a hopper closed to the atmosphere and having an extrusion aperture, conduits operatively connected to said receptacle and said hopper for movement of film-forming material therebetween, means extending substantially the length of the extrusion aperture for diverting a portion only of a stream of film-forming material passing therethrough, and means for discharging the diverted portion only of the film-forming material through said extrusion aperture, the construction and arrangement being such that the portion of the film-forming material not passing through the extrusion aperture returns to said receptacle.

11. Apparatus for preparing films, comprising a receptacle for holding a supply of film-forming material, a hopper, having a passageway extending longitudinally thereof and an extrusion aperture opening into said passageway, conduits connecting said receptacle and said hopper for movement of the film-forming material therebetween, means in said passageway for diverting a portion only of the film-forming material passing therethrough, and means for discharging said diverted portion only of the film-forming material through said extrusion aperture, the construction and arrangement being such that the portion of the film-forming material not passing through the extrusion aperture returns to said receptacle.

12. Apparatus for preparing films, comprising a receptacle for holding a supply of film-forming material, a hopper, having a passageway extending longitudinally thereof and an extrusion aperture opening into said passageway, and conduits connecting said receptacle and said hopper for movement of the film-forming material therebetween, including a conduit for admitting film-forming material into one end of said passageway and a conduit positioned within said passageway and having means for diverting a portion of the film-forming material passing therethrough, the construction and arrangement being such that the diverted portion only of the film-forming material is discharged through said extrusion aperture and the portion of the film-forming material passing through the conduit positioned in said passageway to the discharge end thereof returns to said receptacle.

13. Apparatus for preparing films, comprising a receptacle for holding a supply of film-forming material, a hopper, having a passageway extending longitudinally thereof and an extrusion aperture opening into said passageway, and conduits connecting said receptacle and said hopper for movement of the film-forming material therebetween, including a conduit for admitting film-forming material into one end of said passageway and a conduit positioned within said passageway, said latter conduit having an opening extending along the length thereof and connecting the passageway with the interior of said conduit for diverting a portion only of the film-forming material passing therethrough, the construction and arrangement being such that the diverted portion only of the film-forming material is discharged through said extrusion aperture and the portion of the film-forming material passing through the conduit positioned in said passageway to the discharge end thereof returns to said receptacle.

14. Apparatus for preparing films, comprising a receptacle for holding a supply of film-forming material, a hopper, having a passageway extending longitudinally thereof and an extrusion aperture opening into said passageway, and conduits connecting said receptacle and said hopper for movement of the film-forming material therebetween, including a conduit for admitting film-forming material into one end of said passageway and a conduit positioned in and concentrically of said passageway, said latter conduit having an elongated opening facing away from the extrusion aperture and connecting the passageway with the interior of said conduit for diverting a portion only of the film-forming material passing therethrough, the construction and arrangement being such that the diverted portion only of the film-forming material is discharged through said extrusion aperture and the portion of the film-forming material passing through the conduit positioned in said passageway to the discharge end thereof returns to said receptacle.

15. Apparatus for preparing films from a liquid film-forming material, comprising a hopper, having an extrusion aperture, a conduit having an opening connecting the same with said hopper, and means including a pressure-operated closure member for said opening and supported by said hopper for restricting the flow of the film-forming material into said hopper whereby the flow of said film-forming material through the extrusion aperture is restricted, the construction and arrangement being such that said means is operated by the pressure of the film-forming material passing through said conduit.

16. Apparatus for preparing films from a liquid film-forming material, comprising a hopper, having an extrusion aperture, a conduit mounted on said hopper and having an opening extending the length of the extrusion aperture, said opening connecting said conduit with said hopper, and means including a pressure-operated closure member for yieldably closing said opening for restricting the flow of the film-forming material into said hopper whereby the flow of said film-forming material through the extrusion aperture is restricted.

17. Apparatus for preparing films from a liquid film-forming material, comprising a hopper, having an extrusion aperture, a conduit mounted on said hopper and having an opening extending the length of the extrusion aperture, said opening connecting said conduit with said hopper, and a spring-pressed closure member yieldably closing said opening for restricting the flow of the film-forming material into said hopper whereby the flow of said film-forming material through the extrusion aperture is restricted.

18. Apparatus for preparing films from a liquid film-forming material, comprising a hopper, having an extrusion aperture, a conduit having an opening connecting the same with said hopper, and means including a pressure-operated closure member mounted in said opening for restricting the flow of the film-forming material into said hopper whereby the flow of said film-forming material through the extrusion aperture is restricted, the construction and arrangement being such that said means is operated by the pressure of the film-forming material passing through said conduit.

19. Apparatus for preparing films from a liquid film-forming material, comprising a hopper, having an extrusion aperture, a conduit mounted on said hopper and having an opening extending the length of the extrusion aperture, said opening connecting said conduit with said hopper, and means including a pressure-operated closure member for yieldably closing said opening for restricting the flow of the film-forming material into said hopper whereby the flow of said film-forming material through the extrusion aperture is restricted, the construction and arrangement being such that said means is operated by the pressure of the film-forming material passing through said conduit.

20. Apparatus for preparing films from a liquid film-forming material, comprising a hopper, having an extrusion aperture, a conduit mounted on said hopper and having an opening extending the length of the extrusion aperture, said opening connecting said conduit with said hopper, and a spring-pressed closure member yieldably closing said opening for restricting the flow of the film-forming material into said hopper whereby the flow of said film-forming material through the extrusion aperture is restricted, the construction and arrangement being such that said means is operated by the pressure of the film-forming material passing through said conduit.

WILLIAM JOHN BENNES.
CHARLES EDWARD LEYES.

References Cited in the file of this patent
UNITED STATES PATENTS

| Number | Name | Date |
|---|---|---|
| 1,467,867 | Mauch | Sept. 11, 1923 |
| 1,672,403 | Armstrong | June 5, 1928 |
| 1,990,078 | Kinsella | Feb. 5, 1935 |
| 2,026,740 | Kinsella | Jan. 7, 1936 |
| 2,200,001 | Kenyon | May 7, 1940 |
| 2,293,174 | Rooney | Aug. 18, 1942 |
| 2,351,271 | Leguillon | June 13, 1944 |
| 2,404,406 | Roddy | July 23, 1946 |